US005820749A

United States Patent [19]
Haluska et al.

[11] Patent Number: 5,820,749
[45] Date of Patent: Oct. 13, 1998

[54] HYDROGENATION PROCESS FOR UNSATURATED HYDROCARBONS

[75] Inventors: Jerry L. Haluska, Baton Rouge, La.; Richard B. Pannell, Kingwood, Tex.

[73] Assignee: Exxon Chemical Patents, Inc., Houston, Tex.

[21] Appl. No.: 755,267

[22] Filed: Nov. 22, 1996

[51] Int. Cl.⁶ .................................................. C10G 45/00
[52] U.S. Cl. .............................. 208/216 PP; 208/251 H; 208/254 H; 208/143
[58] Field of Search ........................ 208/216 PP, 251 H, 208/254 H, 143

[56] References Cited

U.S. PATENT DOCUMENTS

| | | | |
|---|---|---|---|
| 3,843,509 | 10/1974 | Suto et al. | 208/111 |
| 3,900,430 | 8/1975 | Beaty, Jr. | 208/216 PP |
| 4,102,822 | 7/1978 | Mulaskey | 502/322 |
| 4,171,285 | 10/1979 | Mulaskey | 502/310 |
| 4,225,421 | 9/1980 | Hensley, Jr. et al. | 208/216 PP |
| 4,301,037 | 11/1981 | Sanchez et al. | 502/302 |
| 4,328,090 | 5/1982 | Stuckey, Jr. et al. | 208/44 |
| 4,394,303 | 7/1983 | Gibson | 502/305 |
| 4,395,328 | 7/1983 | Hensley, Jr. et al. | 208/251 H |
| 4,440,631 | 4/1984 | Togari et al. | 502/302 |
| 4,454,026 | 6/1984 | Hensley, Jr. et al. | 208/216 PP |
| 4,549,957 | 10/1985 | Hensley, Jr. et al. | 208/216 PP |
| 4,629,766 | 12/1986 | Malatesta et al. | 525/222 |
| 4,791,090 | 12/1988 | Pereira et al. | 208/216 PP |
| 4,976,848 | 12/1990 | Johnson | 208/216 PP |
| 5,171,793 | 12/1992 | Johnson et al. | 525/332.1 |
| 5,389,595 | 2/1995 | Simpson et al. | 502/315 |

*Primary Examiner*—Walter D. Griffin
*Attorney, Agent, or Firm*—William G. Muller; Anthony R. Chi

[57] ABSTRACT

The invention relates to catalytic hydrogenation processes for hydrocarbon molecules of number-average molecular weight greater than about 180, and to use therein of an inert catalyst support comprising porous refractory substrate particles having: a) a pore volume distribution wherein i) pores having diameters >150,000 Å constitute greater than about 2% of the total volume, ii) pores having diameters >20,000 Å and <150,000 Å constitute greater than about 1% of the total volume, iii) pores having diameters >2,000 Å and <20,000 Å constitute greater than about 12% of the total volume; and, b) a total pore volume of from about 45% to 86% of the total volume of the substrate particles. Using the invention increased resin productivity of 150% or more can be achieved in industrial operations. Hydrocarbon resins prepared from catalytically or thermally polymerized feedstreams and hydrogenated using the inert support having the described pore size distribution exhibit color and softening point characteristics at least equivalent to previously available resins. Also, increased aromaticity of aliphatic-aromatic resins prepared according to the process is possible leading to particular suitability as tackifers for styrene block copolymers, ethylene-vinyl ester copolymer and acrylic copolymer adhesive compositions.

11 Claims, 4 Drawing Sheets

HYDROGENATION PROCESS FOR UNSATURATED HYDROCARBONS

TECHNICAL FIELD

This invention relates to a catalytic hydrotreating process useful for hydrocarbon-based feeds. In particular the invention relates to an improved process for hydrotreating hydrocarbyl group-containing molecules of molecular weights greater than about 180 with hydrogenation metal catalyst compounds supported on porous refractory substrate particles.

BACKGROUND OF THE INVENTION

Hydrotreating processes for hydrocarbon compounds including such compositions of matter as petroleum fuels, white oils, lubricating oil additives and hydrocarbon resins are well known and practiced industrially. In particular it is known that heterogeneous catalyst systems can be advantageously used to facilitate this process. However, it is recognized in the field that when hydrotreating such compounds, particularly those with higher molecular weights, such as those above having a number-average molecular weights ($M_n$) above about 180, the molecular size accompanying such molecular weights can lead to diffusion limitations. Effective reaction rates require that hydrogen gas molecules and the hydrocarbon compounds come into contact with each other in the presence of an active metal catalyst, and those active metal catalysts are typically affixed within the pores of inert supports. It is generally believed that if the pores are of insufficient diameter the large hydrocarbon molecules are so restricted in movement into, through and out of the pores that reaction rates are diminished.

U.S. Pat. No. 4,102,822 describes hydrotreating catalyst compositions addressed to solving the problems with diffusion limitations present when hydrotreating high molecular weight hydrocarbons. The catalyst compositions comprise irregularly shaped particles having a specified particle diameter distribution, a total pore volume of at least 0.065 cc per cc of packed particles, and interconnected macropores having diameters ranging from 0.1 micron ($1\times10^{-7}$ m) to 15 microns ($1.5\times10^{-5}$ m). Advantages in hydrodemetallation of hydrocarbon feeds are illustrated.

Shaped catalyst particles having increased surface-to-volume ratio to address problems with diffusion limitations, and said to have improved catalyst lifetimes, are described in U.S. Pat. No. 4,394,303. Hydrodesulfurization and hydrodemetallation of crude oils is described with refractory inorganic oxide supports having mean pore diameter in the range of 120 angstroms to 700 angstroms. Table 2 illustrates increased penetration of the support with metal compounds when the pore volume comprises about 19% pore volume of pores with diameter greater than 1000 angstroms. A total pore volume of 0.7 cc/gram is illustrated. Hydroprocessing catalyst compositions are also described in U.S. Pat. No. 5,389,595. Catalysts comprising porous refractory supports are said to be useful for both hydrodenitrogenation and hydrodesulfurization of gas oil, particularly when the support has a narrow pore size distribution, e.g., within 20 angstroms of a median pore diameter that is generally to be between about 60 and 90 angstroms. Pore volumes are illustrated at 0.61 to 0.66 cc/g by mercury porosity.

A process for achieving high aromaticity and low color in petroleum resins comprising the use of an olefinic diluent during hydrogenation of a thermally polymerized resin is described in U.S. Pat. No. 5,171,793. Color of Saybolt 23–30 and aromaticity of 1–20% aromatic hydrogens by $^1$H-NMR is achieved. Preferred temperatures for hydrogenation and subsequent stripping are described, as are both preferred ratios of the hydrogenation reaction components and preferred volumetric throughput during hydrogenation. Preferred monomers and ratios of them by parts for polymerization prior to hydrogenation are also described. The hydrogenation process of U.S. Pat. No. 4,629,766 is incorporated by reference for its description of the catalytic hydrogenation process.

This second document describes temperatures and pressures for hydrogenation of hydrocarbon resins and notes a preference for hydrosulfurization catalysts prepared by impregnating nickel and tungsten oxides onto an alumina support. Pore size distribution of the alumina support is identified as important to the performance of the catalyst, a preference is described for having large pores of radii between 10,000 and 75,000 Å such that at least 10% of the total pore volume is from the large pores. Increased yields and longer runs without catalyst breakdown are described to have been achieved by use of temperatures of 250° C. to 330° C. and hydrogen pressures of from 150 to 200 Atmospheres. Resins with color of above 20 Saybolt and bromine numbers of 0 are achieved. Essentially the same catalyst description appears in U.S. Pat. No. 4,328,090 which addresses the problems of diffusion limitations present with petroleum resins. A principal object of the invention of this document is increased yields of hydrocarbon resins and longer runs while achieving color down to 28+ Saybolt and bromine numbers of 1 to 3 or less. Catalyst C of Table I and Ex. 3 indicates that maximum production, or run length, occurred with 10.5% of total pore volume contributed by pores greater than 10,000 Å.

As is apparent from these documents increased productivity and run times without catalyst degradation is desirable, particularly for hydrocarbon resins, if color, aromaticity, and softening point characteristics can be retained or improved. Additionally, mechanical strength of the catalyst during hydrogenation must be maintained if both run times and productivity are to be increased. Commercial processes utilizing large packed towers place significant weight on supported catalysts and require consideration of reduced mechanical strength from excessively large pore volumes.

SUMMARY OF INVENTION/INVENTION DISCLOSURE

The invention relates to a hydrotreating process for hydrocarbyl-group containing molecules having a number-average molecular weight greater than 180, comprising contacting said molecules with hydrogen in the presence of hydrogenation catalyst metal compounds supported on porous refractory oxide substrate particles having: a) a mean maximum diffusion path length less than or equal to the twice the hydraulic radius of the particle; b) a pore volume distribution wherein, i) pores having diameters >150,000 ($1.5\times10^{-5}$ m). Å constitute greater than about 2% of the total volume, ii) pores having diameters >20,000 Å and <150,000 Å constitute greater than about 1% of the total volume, and iii) pores having diameters >2,000 Å ($2\times10^{-7}$ m) and <20,000 Å ($2\times10^{-6}$ m) constitute greater than about 12% of the total volume; and, c) a total pore volume of from about 45% to 86% of the total volume of the substrate particles. The process according to the invention can achieve increased hydrocarbon resin productivity, up to about 150% or more, through increase in throughput volumes, effective catalyst lifetimes, and product quality. Hydrocarbon resins prepared from catalytically or thermally polymerized feedstreams and hydrogenated according to the invention exhibit color, aromaticity and softening point characteristics at least equivalent to previously available resins. Also, increased retention of aromaticity without corresponding increase in darkening in color or increase in either of halogen content or bromine number is achieved for aliphatic-aromatic resins made according to the described process.

BEST MODE AND EXAMPLES OF THE INVENTION

Figure 1:
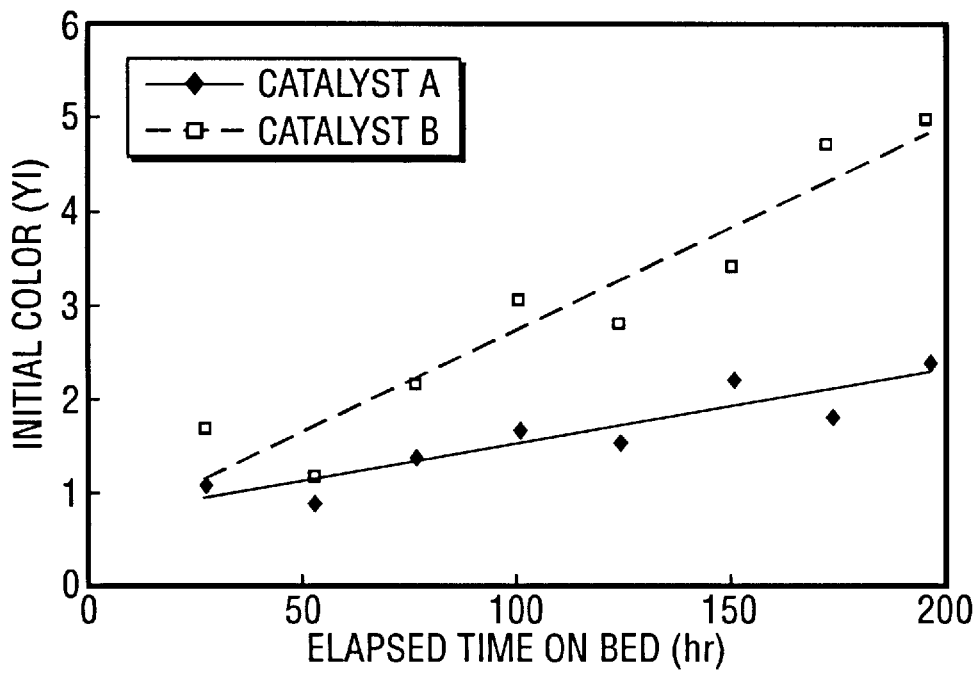
FIGS. 1–8 illustrate resulting color properties of hydrocarbon resins that have been hydrogenated with catalysts according to the invention. Catalyst B is a catalyst from the prior art and is compared against catalysts according to the invention.

The physical characteristics of the porous refractory oxide substrate particles have been found to be critical to the performance of the total catalyst system. Surprisingly effective diffusion of the hydrogen and hydrocarbon molecules into and out of the pores, and contact with the hydrogenation catalyst metal compounds, have been observed to occur with the invention as described. The pore volume distribution preferably will have the b) ii) pores having diameters >20,000 Å ($2\times10^{-6}$ m) and <150,000 Å ($1.5\times10^{-5}$ m) in an amount greater than 1.4% total pore volume, and most preferably equal to or greater than about 3.0%. This pore volume distribution preferably will have the b)(iii) pores having diameter >2,000 Å ($2\times10^{-7}$ m) and <20,000 Å ($2\times10^{-6}$ m) in an amount greater than or equal to 16%, more preferably 20% and most preferably 25%. The macropore distribution, where macropore is defined as those pores having a diameter >2000 Å, ($2\times10^{-7}$ m) will be suitable when comprising at least about 15% total pore volume, thus the total small pores may comprise up to about 85% of the total pore volume. The total range of pore volume is preferably 0.55 to 0.9 cc/g, most preferably 0.6 to 0.7 cc/g.

With any pore size distribution and/or pore volume addressed above, it is unnecessary that the above b) (ii) pores with diameters >20,000 Å and <150,000 Å (or, radius >10,000 Å ($1\times10^{-6}$ m) and <75,000 Å ($0.75\times10^{-5}$ m)) must be at least 10% of the total pore volume so that potential catalyst manufacture difficulties and decreased crush strength are minimized or avoided completely. Thus in this invention pore volumes in this range may be less than 10% if greater than the lower limits identified.

A preferred process according to the invention comprises the step of hydrogenating or hydrotreating (used interchangeably herein) a catalytically or thermally prepared hydrocarbon resin in the presence of the supported catalyst having the described pore size distribution and pore volume. Any of the known processes for catalytically hydrogenating hydrocarbon resins can be modified in accordance with the invention by substituting the catalyst system of the invention, in particular the processes of U.S. Pat. No. 5,171,793, U.S. Pat. No. 4,629,766 and U.S. Pat. No. 4,328,090 and WO 95/12623 are suitable. Each is referred to and incorporated by reference for purposes of U.S. patent practice, and is referred to for description of polymerization processes, monomer selection, hydrogenation processes, and end use applications of the described resins.

Other patent literature describes suitable processes for modification in accordance with the invention. For example, EP 0 082 726 describes a process for the hydrogenation of petroleum resins, from catalytic or thermal polymerization of olefin and diolefin containing streams, using nickel-tungsten catalyst on a gamma-alumina support wherein the hydrogen pressure is $1.47\times10^7$–$1.96\times10^7$ Pa and the temperature is in the range of 250°–330° C. The feedstreams are said to contain $C_5$ and/or $C_6$ olefin and/or diolefin streams, and, for catalytic polymerization, $C_8/C_9$ aromatic olefins, e.g., styrene, vinyl benzene and optionally indene. Thermal polymerization is usually done at 160° to 320° C., at a pressure of $9.8\times10^5$ to $11.7\times10^5$ Pa and for a period typically of 1.5 to 4 hours. After hydrogenation the reactor mixture may be flashed and further separated to recover the hydrogenated resin. Steam distillation may be used to eliminate oligomers, preferably without exceeding 325° C. resin temperature.

Light colored thermally polymerized resins wherein the hydrotreating process of this invention may be effectively used include those described in U.S. Pat. No. 5,502,104, the description of which is also referred to and incorporated by reference for purposes of U.S. patent practice.

Additional description and information appears in the technical literature. The term hydrocarbon resin as used in the specification and claims include the known low molecular weight polymers derived from cracked petroleum distillates, coal tar, turpentine fractions and a variety of pure monomers. The number average molecular weight is usually below 2000, and physical forms range from viscous liquids to hard, brittle solids. Polymerization feedstreams are derived from the sources described above via various known means and methods of fractionation. Friedel-Crafts polymerization is generally accomplished by use of known catalysts in a polymerization solvent, and removal of solvent and catalyst by washing and distillation. Thermal catalytic polymerization is also utilized, particularly for aliphatic, cyclo-aliphatic and aliphatic-aromatic petroleum resins. The preferred hydrocarbon resins are those known to be useful as tackifiers for adhesive compositions, particularly the petroleum resins derived from the deep cracking of petroleum distillates, hydrocarbon resins from pure aromatic monomers, the coumarone-indene resins from coal tar and the polyterpenes derived from turpentine fractions. Included in petroleum resins are those that have been modified with aromatic or terpene containing feedstreams. For additional description of feedstream derivation, monomer composition, methods of polymerization and hydrogenation, reference may be made to patent literature (see Background) and to technical literature, e.g., Hydrocarbon Resins, Kirk-Othmer Encyclopedia of Chemical Technology, v. 13, pp. 717–743 (J. Wiley & Sons, 1995); Encycl. of Poly. Sci. and Eng'g., vol. 7, pp. 758–782 (John Wiley & Sons, 1987), and the references cited in both of them. Additionally, reference may be made to EP 0 240 253 and its corresponding application U.S. Ser. No. 07/065,792, filed 24 Jun. 1987. All of these references are incorporated by reference for purposes of U.S. patent practice.

The known natural resins will additionally be suitable for hydrotreating in accordance with the invention. The natural resins are traditional materials documented in the literature, see for example, Encycl. of Poly. Sci. and Engg., vol. 14, pp. 438–452 (John Wiley & Sons, 1988).

The rosins capable of hydrotreating in accordance with the invention includes any of those known in the art to be suitable as tackifying agents, this specifically includes the esterified rosins. The principal sources of the rosins include gum rosins, wood rosin, and tall oil rosins which typically have been extracted or collected from their known sources and fractionated to varying degrees. Additional background can be obtained from technical literature, e.g., *Kirk-Othmer Encycl. of Chem. Tech.*, vol. 17, pp. 475–478 (John Wiley & sons, 1968) and *Handbook of Pressure-Sensitive Adhesive Technology*, ed. by D. Satas, pp. 353–356 (Van Nostrand Reinhold Co., 1982).

Catalyst preparation and manufacture is conducted in accordance with methods well known in the art. Hydrogenation catalysis with supported metal oxides on alumina is practiced industrially and methods of obtaining support or carrier shapes suitable to decreased mean maximum diffusion path and design pore volumes are within the skill in the art when combined with the invention description presented. For example, pre-shaped, calcined alumina can be impregnated with the catalyst metal compounds or the catalyst metal compounds can be precipitated in the presence of finely divided alumina support material which is thereafter shaped. Both methods are discussed in the literature, see generally, *Heterogenous Catalysis in Practice*, Charles N. Satterfield, Chapters 4 and 5 (McGraw-Hill, Inc., 1980), and literature cited therein. Specifically designed shapes can be achieved by extrusion through suitably designed dies of thick pastes of, for example, the calcined alumina or the precipitated, calcined alumina. Macropores meeting the pore size distribution described can be introduced into the shaped catalysts by incorporating in the pastes wood flour, carbon black, α-cellose, or other fine organic powders that can be burned out after extrusion and cutting. Additional methods are addressed in U.S. Pat. Nos. 4,016,107, 4,016,108 and "The Control of the Pore Volume and Pore Size Distribution In Alumina and Silica Gels by the Addition of Water Soluble Organic Polymers," D. Basmadjian, et al, Journal of Catalysis 1, 547–563 (1962). These documents are incorporated by reference for purposes of U.S. patent practice, particularly with respect to the preparation of the supported metal catalyst compounds.

Shaped catalyst supports are preferred in that these are known in the art to provide increased surface area to volume ratios, and consequent decrease in the mean maximum diffusion path length relative to the maximum radius. A mean maximum diffusion path length less than the maximum radius is a highly preferred embodiment of the invention. The maximum radius is defined here as twice the hydraulic radius determined from the ratio of the cross-sectional area to the perimeter of the particle. The perimeter is defined as the wetted surface of an equivalent non-porous shaped particle cross-sectioned slice and the cross-sectional area typically being measured in the plane perpendicular to the direction of extrusion (for particles derived from extruded pastes). The hydraulic radius will be less than the radius of a cylinder of sufficient diameter to encircle the shaped particle while touching the outermost projections of it ("Reference Diameter, RD"). See also the descriptions of shaped catalysts in U.S. Pat. No. 4,394,303 and U.S. Pat. No. 5,389,595. These documents are both referred to and incorporated by reference for purposes of U.S. patent practice, particularly with respect to the descriptions of support materials, selection of hydrogenation metals and means of preparing the supported metal catalyst compounds.

Shaped catalyst supports of this invention, that is the porous refractory substrate particles have a hydraulic radius ratio (HRR) <1.0 where HRR is defined as the hydraulic radius of the shaped catalyst support divided by the hydraulic radius of a cylindrical support having RD. Preferred shaped catalyst supports have a HRR <0.9, even more preferred and shaped catalyst supports having a HRR<0.85, and especially preferred are shaped catalyst supports having a HRR<0.8.

The term "shaped catalyst" refers to those made by the method of increasing surface-to-volume ratio by preparing an extruded particle in shapes with other than solid circular cross-section. A variety of shapes are possible, including particles with channels, with holes in them, having star shapes and the like. Although the teachings of this invention apply to any catalyst having a polylobal cross-section, it has been found that preferred shapes are dictated by two practical considerations. The first consideration is the manufacturing ease for making the die plate for the extruder. This dictates that the shape chosen not have small acute angular elements. Since most die plates are made by drilling holes through a plate of metal that is relatively thick compared to the diameter of the holes, a preferential shape is one that is composed of overlapping circular segments of the same or different radii, defined herein as a polylobal or multi-grooved shape.

Thus the porous refractory oxide support material is usually prepared in the form of shaped particulates, with the preferred method being to extrude a precursor of the desired support (such as a hydrated alumina) through a die having openings therein of desired size and shape, after which the extruded matter is cut into extrudates of desired length. The support particles may also be prepared by mulling (or pulverizing) a precalcined amorphous refractory oxide to a particle size less than about 100 microns and extruding the material.

The extruded particles may have any cross-sectional shape, i.e., symmetrical or asymmetrical, but most often have a symmetrical cross-sectional shape, including a cylindrical shape, preferably a polylobal or multi-grooved shape. The cross-sectional diameter of the particles is usually about $\frac{1}{40}$ to about $\frac{1}{8}$-inch, preferably about $\frac{1}{32}$ to about $\frac{1}{12}$ inch, and most preferably about $\frac{1}{24}$ to about $\frac{1}{15}$ inch. Among the preferred particles are those having quadralobal cross-sectional shapes resembling that of a four-leaf clover, including asymmetrical shapes as well as symmetrical shapes such as in FIG. 1 of U.S. Pat. No. 4,028,227. Other preferred catalyst configurations are cross-sectional shapes resembling that of a three-leaf clover, as shown, for example, in FIGS. 8 and 8A of U.S. Pat. No. 4,028,227. See also U.S. Pat. No. 4,510,261.

The support material is typically comprised of such porous inorganic refractory oxides as silica, magnesia, silica-magnesia, zirconia, silica-zirconia, titania, silica-titania, alumina, silica-alumina, alumino-silicate, etc., with supports containing γ-alumina being highly preferred. Preferably, the supports are essentially free of crystalline molecular sieve materials. Mixtures of the foregoing oxides are also contemplated, especially when prepared as homogeneously as possible. Among the useful catalyst materials in the present invention are the supports disclosed in the U.S. Pat. Nos. 4,686,030, 4,846,961, 4,500,424, and 4,849,093 are herein incorporated by reference for purposes of U.S. patent practice.

A preferred process of the invention uses a catalyst comprising the metals nickel and/or cobalt and one or both of molybdenum or tungsten on the invention support. The catalyst can be prepared by impregnating the support material with water soluble compounds of nickel and/or cobalt and either molybdenum or tungsten. Examples of water soluble compounds useful for preparing the catalyst are nickel nitrate, cobalt nitrate, ammonium tungstate, and ammonium molybdate. Suitable catalyst supports are high-surface area aluminas such as η-alumina and γ-alumina. Preferably the support is a γ-alumina. After impregnation, the support containing the nickel and/or cobalt and tungsten or molybdenum compounds is dried to remove the water from the impregnation solution. Suitable temperatures for drying the catalyst are typically from about 80° to 150° C. The dried support containing the nickel and/or cobalt and tungsten or molybdenum compounds is heat treated to decompose the nickel and/or cobalt and tungsten or molybdenum compounds to their oxides. Suitable temperatures for decomposing the nickel and/or cobalt and tungsten or molybdenum compounds to their oxide is about 300° to 550° C. The preferred metals for preparing the catalyst are nickel and tungsten. The amount of the nickel oxide and/or cobalt oxide on the support ranges from 2 to 10 weight percent. The amount of tungsten or molybdenum oxide on the support after preparation ranges from 5 to 25 weight percent. Preferably the catalyst contains 4 to 7 weight percent nickel oxide and 18 to 22 weight percent tungsten oxide. See also, Novel Hydrotreating Catalysts Prepared For Heteropolyanion Complexes Impregnated on Alumina, A. M. Maiba and N. W. Cauf, *Applied Catalysts* 48, 181–197(1989).

In addition, a basic promoter may be used with the metal compounds, particularly if improved halogen resistance is sought. Promoters include metals from Groups 1–3, including the lanthanide and actinide series, of the periodic table of elements. Typically, the catalyst may be made with lanthanum, potassium, magnesium, rubidium, cesium, neodymium, zinc, and calcium among others. The preferred promoters are typical lanthanum and potassium. The basic promoters may be used in amounts of 0.25–10 wt % to total weight, preferably 1–3 wt %. See U.S. Ser. No. 5,107,051, incorporated by reference for purposes of U.S. patent practice, for description of suitable catalyst metals, basic promoters, and a hydrotreating process.

The calcined particulate containing at least one Group VIII metal component and the porous refractory oxide may be subsequently contacted and further calcined with at least one source of additional catalytic promoter material. Preferred additional catalytic promoter materials include phosphorus, titanium, zirconium, hafnium, vanadium, manganese, magnesium, calcium, lanthanum, copper, Group VIB metals including chromium, molybdenum and tungsten, as well as more of the same Group VIII metal as contained in the Group VIII metal-containing calcined particulate or different Group VIII metals. Preferred Group VIII metals include cobalt, nickel and iron. Highly preferred additional catalytic promoter materials contain one or more Group VIB metals, with molybdenum being most preferred. The composition containing additional catalytic promoter combined with Group VIII metal-containing calcined porous refractory oxide is normally calcined for a sufficient time at a temperature from about 260° C. to about 540° C., but preferably below about 570° C., and most preferably in the range from about 316° C. to about 540° C. Typically, the time of all calculation steps disclosed herein is at least 0.25 hours, preferably at least 0.5 hours, and more preferably at least one hour.

Additional hydrogenation process description suitable with the support particles of the invention appears in U.S. Pat. No. 5,491,214 which is incorporated by reference for purposes of U.S. patent practice. Catalysts useful in the process of this document are hydrogenation catalysts that are selective enough in their action so that only the color bodies are hydrogenated. The carbon-carbon double bonds in the resin may not be substantially hydrogenated. Therefore, the physical properties of the resin that are commonly measured, e.g., softening point, cloud point, molecular weight, UV absorbance and heat stability, are not significantly unaffected. In addition, color body precursors are not hydrogenated to any significant extent. Color body precursors are defined as colorless materials that become colored after hydrogenation.

Catalysts with the required selectivity can be selected from among various forms of the metals of Groups VIII, VI B, VIII B and I B and II B. These metals can be used alone or in combination, either as the free metal, the sulfided metal or as a metal compound. The metals (or metal compounds) are carried on a suitable support having the pore size distribution of the invention. Copper chromite, copper/zinc, sulfided platinum on charcoal, ruthenium on alumina and palladium on charcoal are preferred. Copper chromite and copper/zinc are most preferred. One copper chromite catalyst typically used is a mixture of copper chromite, copper oxide and manganese oxide. A Cu/Zn catalyst typically used is a mixture of copper, zinc and aluminum oxides. Copper/zinc is particularly useful when the resin is treated while still dissolved in the polymerization solvent.

The catalysts of this invention are typically activated by a sulfiding agent in the presence of hydrogen. The sulfur compounds that can be used include $H_2S$, carbon disulfide, methyldisulfide, ethyldisulfide, propyldisulfide, isopropyldisulfide, butyldisulfide, tertiary butyldisulfide, thianaphthene, thiophene, secondary dibutyldisulfide, thiols, sulfur containing hydrocarbon oils and sulfides such as methylsulfide, ethylsulfide, propylsulfide, isopropylsulfide, butylsulfide, secondary dibutylsulfide, tertiary butylsulfide, dithiols and sulfur-bearing gas oils. Any other organic sulfur source that can be converted to $H_2S$ over the catalyst in the presence of hydrogen can be used. The catalyst may also be activated by an organo sulfur process as described in U.S. Pat. No. 4,530,917 and other processes described therein and this description is incorporated by reference into this specification.

Generic hydrogenation treating conditions include reactions in the temperature of about 100° C.–350° C. and pressures of between five atmospheres (506 kPa) and 300 atm. (30390 kPa) hydrogen, for example, 10 to 275 atm. (1013 kPa to 27579 kPa). In one embodiment the temperature is in the range including 180° C. and 320° C. and the pressure is in the range including 15195 kPa and 20260 kPa hydrogen. The hydrogen to feed volume ratio to the reactor under standard conditions (25° C., 1 atoms. pressure) typically can range from 20–200, for water-white resins 100–200 is preferred.

Catalyst activity decreases over time due to carbonaceous deposition onto the catalyst support, this can be eliminated or removed by regenerating the catalyst bed with high pressure hydrogen at temperatures between about 310° C.–350° C. High pressure here means, for example, at least about 180 bar. This regeneration is best accomplished in the absence of hydrocarbon feed to the reactor, e.g., during interruption of the hydrogenation process.

Hydrogenated polymeric resins of the invention specifically include hydrocarbon resins suitable as tackifers for adhesive compositions, particularly adhesive compositions comprising polymeric base polymer systems of either natural or synthetic elastomers, including such synthetic elastomers as those from styrene block copolymers, olefinic rubbers, elastomers or plastomers, and various copolymers having elastomeric characteristics, e.g., ethylene-vinyl ester copolymers. Such adhesive compositions find particular utility in hot melt adhesive and pressure sensitive adhesive applications such as those for adhesive tapes, diaper tabs, envelopes, note pads, and the like. Often compatibility of the tackifier with polymeric base polymer systems is best achieved by selection of a hydrocarbon resin that is high in aromatic monomer content. Concurrently it is sought to select a tackifier that has color characteristics commensurate with those of the base polymer system, preferably both the polymer system and its tackifier will be essentially transparent and low in chromophores, that is, color. Retention of this low color characteristic is important during heating operations such as present in formulation by melt processing and application of the adhesive compositions to substrate materials under elevated temperatures. Adequate hydrogenation is known to achieve desirable heat stability of low color properties in polymeric hydrocarbon resins made from either aliphatic or aromatic monomers, or mixes thereof. Both objectives can be achieved by use of the invention process.

It is also known that when using petroleum resins as tackifiers for the above adhesive compositions it can be difficult to retain incorporated aromaticity in the resin while achieving low color characteristics. Aromaticity is increased typically by increasing the ratio of aromatic monomers to aliphatic monomers during polymerization, but this increases the level of yellow color of the resulting resin. Color can then be reduced by hydrogenation of the resin after polymerization. However, the level of hydrogenation often necessary to improve color typically results in hydrogenation of at least some of the aromatic unsaturation and the consequent reduction in retained aromaticity. The process of the invention thus provides a method of increasing retained aromaticity while achieving the low color often commercially sought.

In addition to the function of hydrogenating unsaturated bonds and color bodies, the support particles of the invention can be used in other hydrotreating processes, such as those used for denitrogenation, desulfurization and demetallation see for example several of those patent documents provided above and U.S. Pat. No. 5,198,100. These references teach specific catalyst metal compounds and hydrotreating processes, all of which is incorporated by reference for purposes of U.S. patent practice.

The following examples are presented to illustrate the foregoing discussion. All parts, proportions and percentages are by weight unless otherwise indicated. Although the examples may be directed to certain embodiments of the present invention, they are not to be viewed as limiting the invention in any specific respect.

Catalyst Evaluation Procedure

In order to evaluate catalyst performance, effective procedures were developed to directly compare the relative performance of two hydrogenation catalysts in decoloring and degree of olefinic saturation by measuring resin color and thermal stability respectively. The procedure used to make the comparison involved a dual train isothermal hydrogenation pilot unit consisting of two tubular reactors each having an inside diameter of 1.3 cm and length of 77 cm. The unit had two identical reactors, each of which was loaded with a different test catalyst. Both reactors were run under identical conditions of temperature, pressure, gas and liquid flow rates, with a common feed mixture. Samples of the resulting hydrogenated products were collected periodically and processed for analysis. For hydrocarbon resins, comparing the decoloring and thermal stability of the two resulting hydrogenated resin products with time was effective in determining which of the two test catalysts was superior in performance.

Resin color was determined using a Hunter Ultrascan Colorimeter Model US 8000. This instrument was standardized using toluene as a reference. The sample to be analyzed was prepared by weighing 10 grams (±0.02 g) of resin into a 20 ml. scintillation vial. An equal weight of toluene, 10 grams (±0.02 g), was added to the vial. The vial was then shaken until all of the resin is dissolved. The solution was then poured into a quartz cuvette and then analyzed for yellowness index (YI) color using the Hunter Colorimeter. The degree of saturation was determined by a thermal stability measurement test. This test simulates conditions which may produce color degradation, an undesirable characteristic from the customer's point of view. Heat stability aged color is a technical specification for hydrogenated resins. The sample to be analyzed was prepared by weighing 10 grams (±0.02 g) of resin into an 8 oz. wide mouth jar. The uncapped jar was then placed in an aluminum block located in a 175° C. convection oven for a period of 5 hours. The jar was removed from the oven after 5 hours and allowed to cool for 30 minutes. Toluene in the amount of 10 grams (±0.02 g) was added to the jar. The jar was then capped and shaken on a shaker until the resin is dissolved. The solution was then poured into a quartz cuvette and analyzed for Gardner Color using the Ultrascan Colorimeter.

Reactor Loading Procedure

Catalyst was graded for uniformity of extrudate length. A 100 ml graduated cylinder was filled with 75 ml of an aliphatic-aromatic solvent (Varsol® 1, Exxon Chemical Company) and a tare weight was recorded. Catalyst was then densely loaded to a volume of 90 ml. The section of tube above the catalyst was then filled with 5 mm glass balls and the tube was tapped again to ensure that the catalyst was adequately packed.

Catalyst Sulfidation Procedure

The catalyst was flushed for over 10 hours with Varsol® 1. After flushing, the catalyst was activated by treating with dimethyldisulfide (DMDS) in accordance with known procedures.

Hydrogenation Following Activation

The resin feed used in these examples was a solution of a thermally polymerized hydrocarbon resin (Escorez® 8120, Exxon Chemical Co.) of 85° C.–150° C. softening point obtained by polymerizing a feedstream containing substituted and unsubstituted $C_5$ cyclic olefins and $C_{10}$ bicyclic diolefins, the remainder being inert aromatics such as benzene and toluene at 250°–300° C. under autogenous pressure. The solvent was Varsol® 1, being a paraffinic solvent containing about 20% aromatics and boiling from 150°–190° C.

The hydrocarbon resin was diluted with the solvent to the levels of between 20–50% preferably in the 30–35% range. This solution served as the feedstock. This feed was passed through both reactors at a temperature of 250°–260° C. at a liquid feed/standard gas volume ratio of 200 at a space velocity of 1.0–1.5 volumes of feed per volume of catalyst per hour (vvh). Periodic product samples were collected from both reactors, the polymerizate was processed to hard resin and analyzed to track initial color and thermal stability performance with time. The catalyst which showed the better decoloring and heat stability was then established as the best performing with regard to rate of production and longevity.

The data in Table 1 lists the properties of the novel partial hydrogenation/decoloring catalyst (Catalysts A and C–E) of this invention and the high performing catalyst B used as a reference of comparison. The following examples illustrate the superior performance of the short diffusion path, macropore distributed catalyst of the resin hydrogenation process.

Example 1

The feedstock was a freshly made up solution of the resin above commercially diluted to 35 weight percent resin with Varsol® 1. Test catalyst loading and activation was according to the procedures described in the Catalyst Evaluation Procedure Section. This example illustrates the teachings of this invention specifically in relation to the importance of macropore size distribution and short diffusion paths on catalyst performance.

Figure 2:
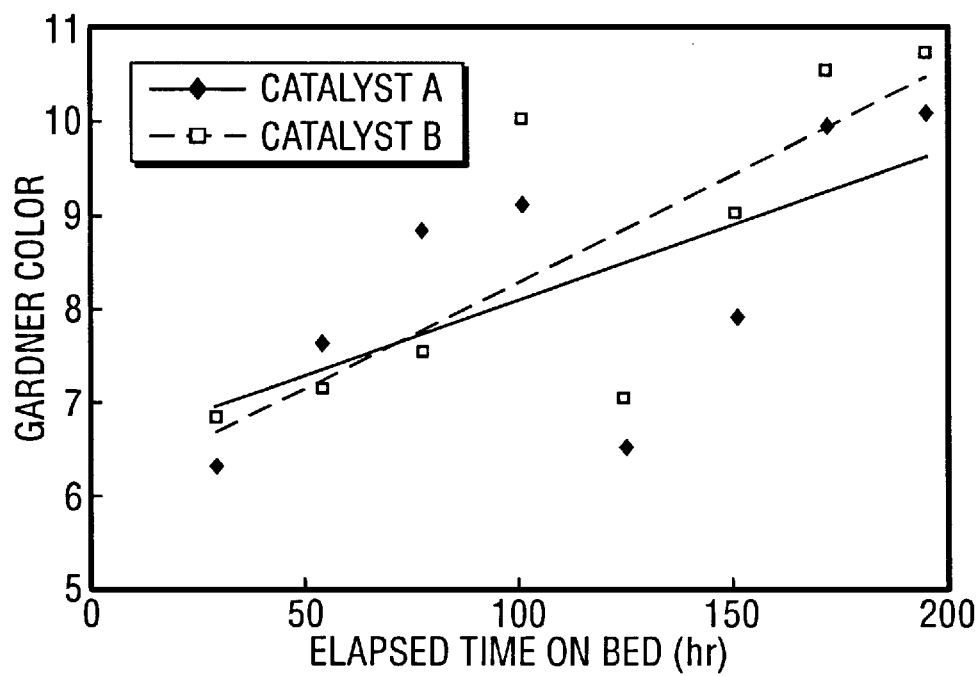

In this example, Catalyst A, the short diffusion path catalyst is compared to Catalyst B, a high performing catalyst lacking the macropore distribution and diffusion path features of the current invention. The experiment was run at a hydrogenation temperature of 255° C. at a hydrogen pressure of 20.8 MPa, at a feed rate of one volume at ambient T, P per volume catalyst per hour. These conditions are selected to be especially severe so as to cause a deterioration in catalyst capabilities within a reasonable experimental time. That catalyst which demonstrates the better decoloring and heat stability results is the superior catalyst. FIGS. 1 and 2 presents these comparisons. (Least square fits were used for all figures). Note that the catalyst having the properties of this invention demonstrates the best decoloring longevity and the best olefinic saturation as measured by thermal stability.

Example 2

Figure 3:
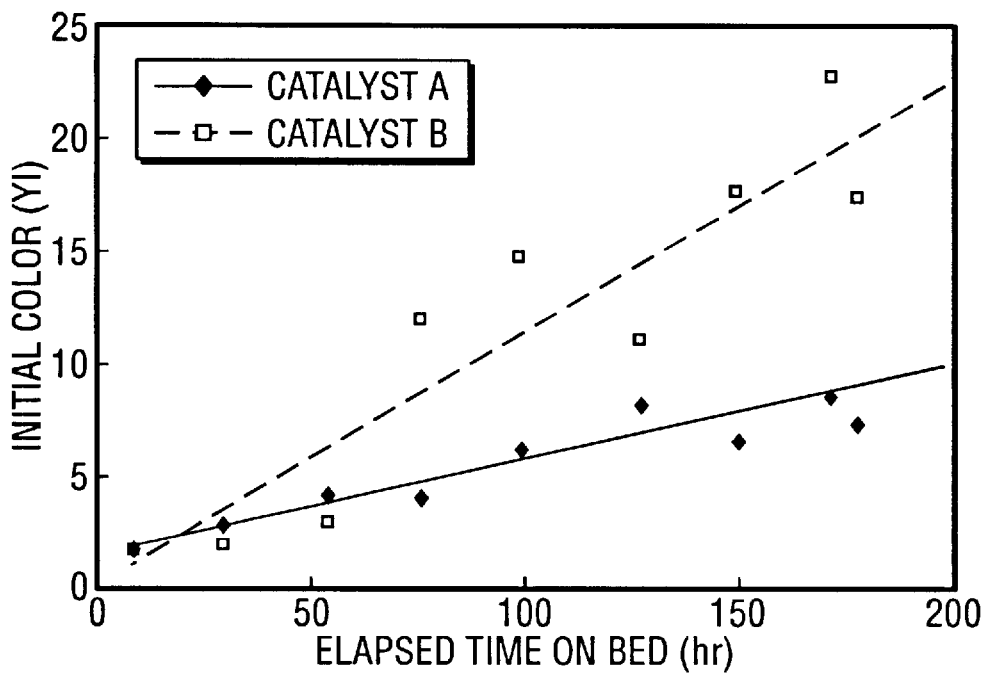
Figure 4:
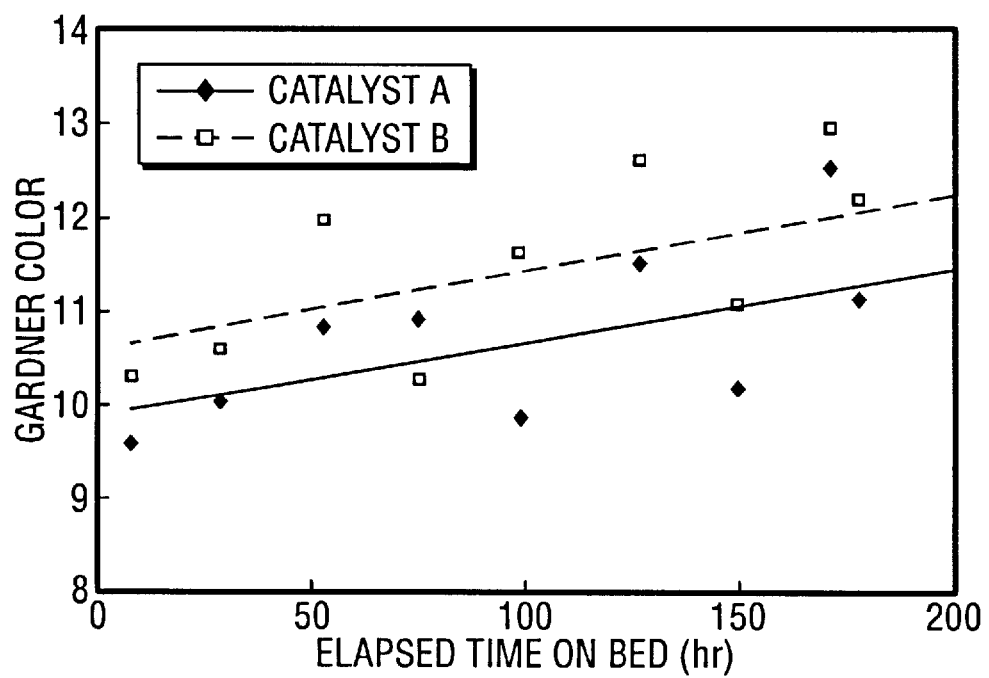

For this example, Catalyst A, the short diffusion path catalyst, was compared to Catalyst B, at even more severe conditions to compare the diffusion limitations of the two catalysts. In this example, feed flow rates were increased by 50% over the previous example to 1.5 volumes of feed per volume of catalyst. FIG. 3 and 4 show the results. Again, Catalyst A outperformed the reference catalyst in both decoloring and thermal stability properties clearly indicating the superior performance.

Example 3

Figure 5:
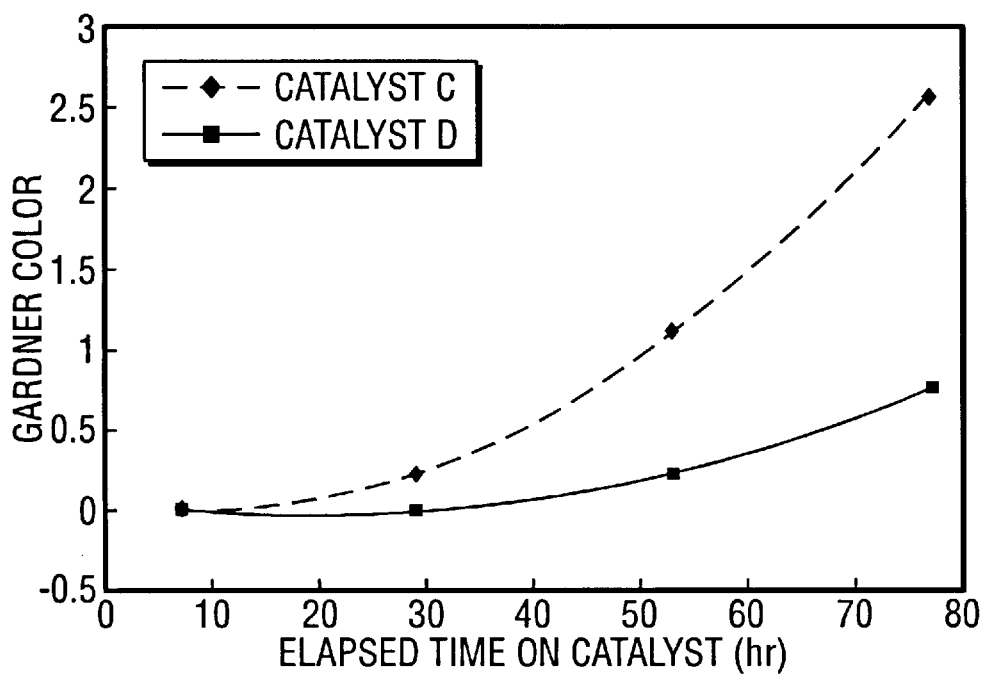
Figure 6:
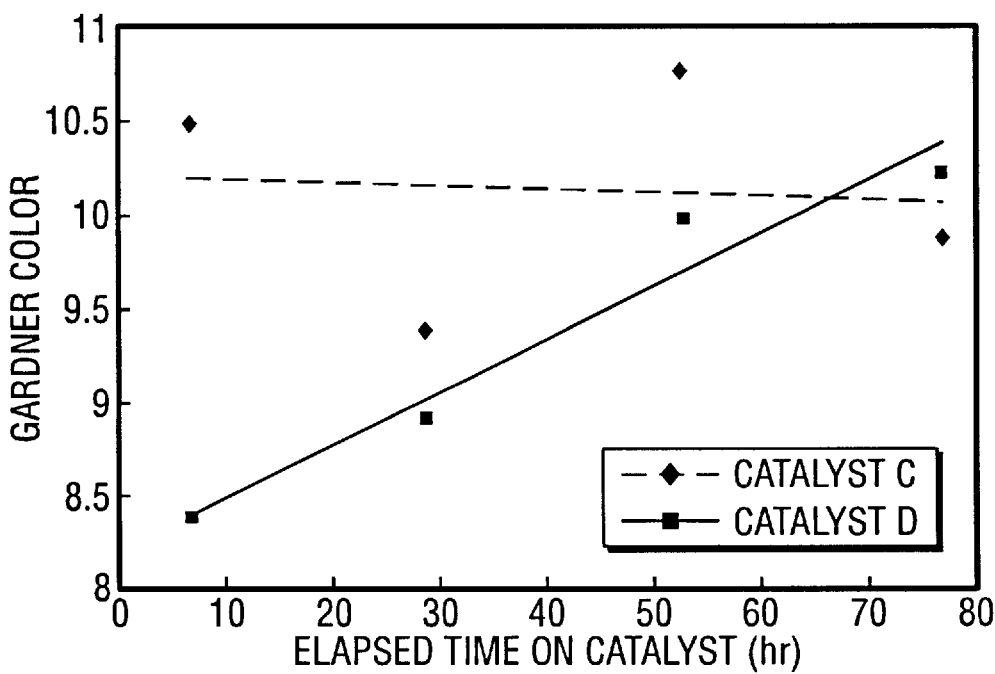

Hydrogenation with Catalyst D was run under the same conditions and concurrently with Catalyst C in accordance with the description above for Examples 1 and 2. Both catalysts were on cylindical particles of 1/16 in. nominal diameter and 1/4 in. nominal length. As can be seen from Table I, Catalyst C has a pore size distribution where the pores having a radius >10,000 Å constitute about 10% total pore volume (TPV) and Catalyst D has a pore size distribution where the pores having a radius >10,000 Å constitute about 7.7% TPV. As illustrated in FIGS. 5 and 6 Catalyst D provides better decoloring and thermal stability even at a significantly lower volume of the largest macropores. The thermal stability test procedure is such that after certain elapsed times all catalysts demonstrate equivalent thermal stability characteristics. FIG. 6 illustrates this.

Example 4

Figure 7:
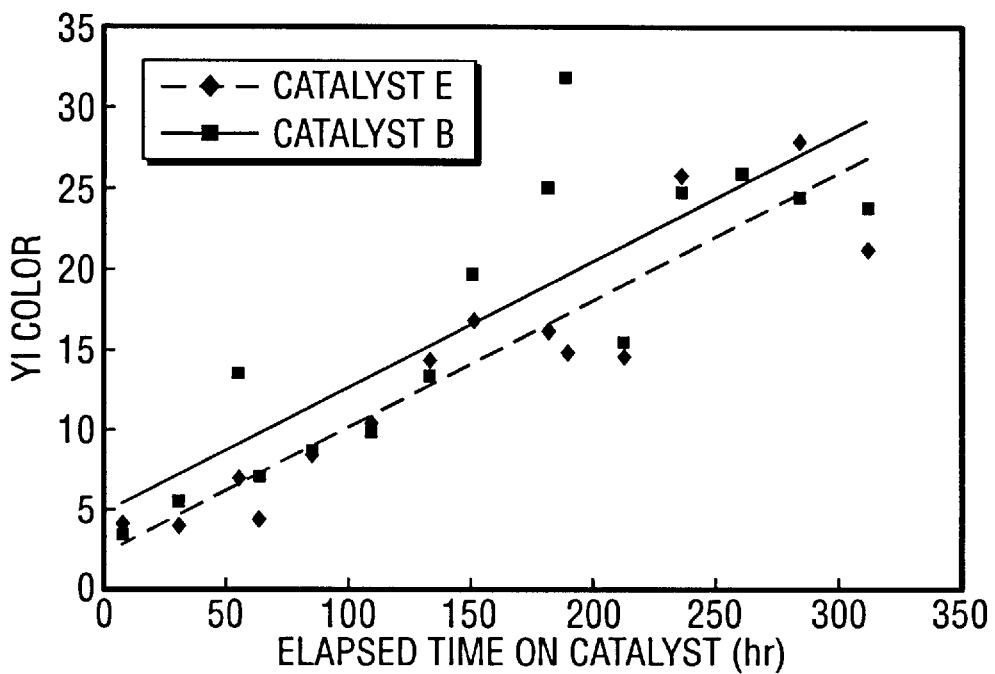
Figure 8:
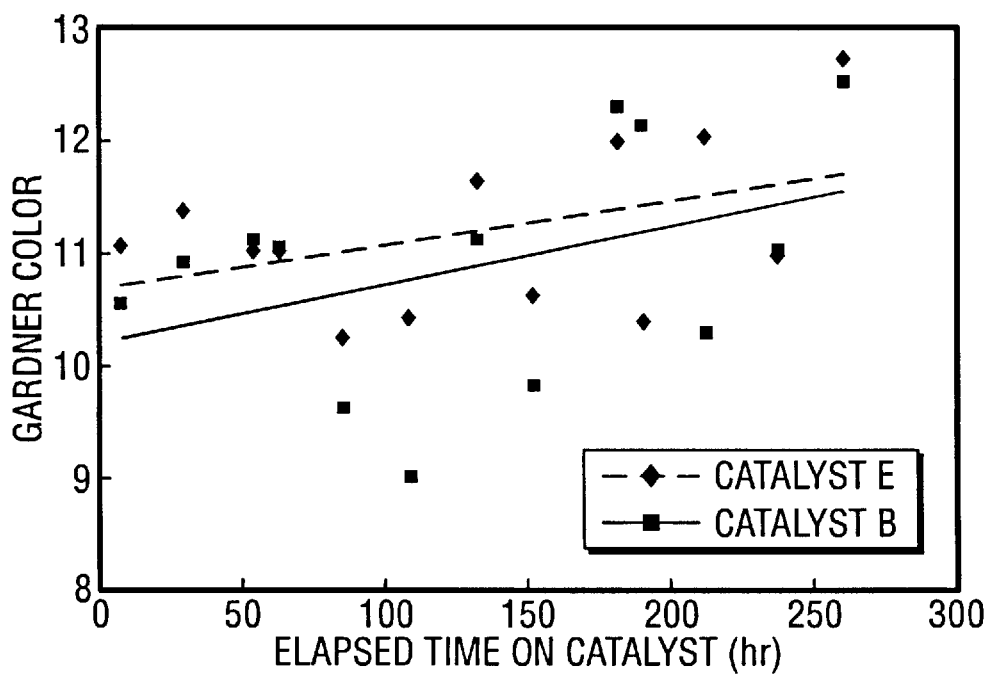

Hydrogenation with Catalyst E was run under the same conditions and concurrently with Catalyst B in accordance with the description above for Examples 1 and 2. Again, both catalysts were cylindrical extrudates with diameter length as in Example 3. As can be seen from Table I, Catalyst E had a pore size distribution where the pores having a radius >10,000 Å constituted about 7.1% TPV and Catalyst B had a pore size distribution where the pores having a radius >10,000 Å constitute about 10% TPV. As illustrated in FIGS. 7 and 8 Catalyst E provided essentially equivalent decoloring and thermal stability at a significantly lower volume of the largest macropores.

For both Examples 3 and 4, the reduction in volume in the largest macropore range provides both for improved crush strength and ease of manufacture.

TABLE I

CATALYST PROPERTIES

| | Catalysts | | | | |
|---|---|---|---|---|---|
| | A | B (Comp.) | C | D | E |
| WO$_3$, wt % | 22.4 | 20.1 | 20.6 | 21.4 | 20.5 |
| NiO | 5.0 | 5.3 | 5.1 | 5.6 | 5.2 |
| Surface Area, M$^2$/gm | 172 | 234 | 171 | 192 | 193 |
| Pore Volume, cc/gm | 0.65 | 0.64 | 0.62 | 0.52 | 0.56 |
| Pore Vol. Distribution, cc/gm | | | | | |
| 0–200 Å Dia. | 0.40 | 0.383 | 0.42 | 0.38 | 0.36 |
| 200–2000 Å Dia. | 0.06 | 0.112 | 0.05 | 0.03 | 0.05 |
| 2000–20,000 Å Dia. | 0.16 | 0.081 | 0.10 | 0.06 | 0.10 |
| 20,000–150,000 Å Dia. | 0.01 | 0.065 | 0.03 | 0.02 | 0.02 |
| >150,000 Å Dia. | 0.02 | ~0+ | 0.03 | 0.02 | 0.02 |
| Shape, 1/16 in. Radius* | S | R | R | R | R |
| % >10,000 Å | 4.6 | 10 | 10 | 7.7 | 7.1 |
| % >1,000Å | 29 | 23 | 26 | 19 | 25 |

*S = shaped particle support; R = cylindrical particle support
+ below detectable level The following is claimed:

1. A hydrotreating process for hydrocarbyl group-containing molecules having a number-average molecular weight greater than 180, comprising contacting said molecules with hydrogen in the presence of hydrogenation catalyst metal compounds supported on porous refractory substrate particles having:

a) mean maximum diffusion path length less than or equal to twice the hydraulic radius;

b) a pore volume distribution wherein
      i) pores having diameters >150,000 Å constitute greater than about 2% of the total volume,
      ii) pores having diameters >20,000 Å and <150,000 Å constitute greater than about 1% of the total volume,
      iii) pores having diameters >2,000 Å and <20,000 Å constitute greater than about 12% of the total volume; and, c) a total pore volume of from about 45% to 86% of the total volume of the substrate particles.

2. The process of claim 1 wherein said b) ii) pores having diameters >20,000 Å and <150,000 Å constitute greater than about 1.4% of the total volume.

3. The hydrotreating process of claim 1 comprising hydrotreating at a temperature of 100° C. to 330° C. and hydrogen pressure of 1013 kPa to 27.6×10$^3$ kPa.

4. The process of claim 3 wherein said temperature is at least 180° C. and said pressure is 1013 kPa to 15.2×10$^3$ kPa.

5. The process of claim 1 wherein said hydrogenation catalyst metal compounds comprise from about 4 to 7 wt % NiO and from about 15 to 25 wt % $WO_3$ based upon the total weight of the catalyst metal compounds and substrate particles.

6. The process of claim 1 wherein said hydrocarbyl group-containing molecules comprise petroleum resins.

7. The process of claim 1 wherein said hydrocarbyl group-containing molecules comprise aliphatic or cycloaliphatic petroleum resins.

8. The process of claim 1 wherein said hydrocarbyl group-containing molecules comprise aliphatic-aromatic petroleum resins.

9. The process of claim 1 wherein said particles have a hydraulic radius ratio (HRR) <1.0.

10. The process of claim 1 wherein pores having diameters >20,000 Å provide less than 10% of total pore volume.

11. The process of claim 1, wherein the hydrocarbyl group containing molecules are one or more rosins or rosin esters.

* * * * *